US011166408B2

(12) United States Patent
Stuart et al.

(10) Patent No.: US 11,166,408 B2
(45) Date of Patent: Nov. 9, 2021

(54) OPERATION OF AN AGRICULTURAL AGITATING SYSTEM

(71) Applicant: CNH Industrial Canada, Ltd., Saskatoon (CA)

(72) Inventors: Graham Douglas Stuart, Warman (CA); Nicholas George Alfred Ryder, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 355 days.

(21) Appl. No.: 16/264,900

(22) Filed: Feb. 1, 2019

(65) Prior Publication Data

US 2020/0245541 A1 Aug. 6, 2020

(51) Int. Cl.
| | |
|---|---|
| *B22C 5/00* | (2006.01) |
| *A01C 19/00* | (2006.01) |
| *B01F 7/00* | (2006.01) |
| *B01F 7/08* | (2006.01) |
| *B01F 15/00* | (2006.01) |
| *A01C 15/00* | (2006.01) |

(52) U.S. Cl.
CPC .......... *A01C 19/00* (2013.01); *A01C 15/007* (2013.01); *B01F 7/00408* (2013.01); *B01F 7/08* (2013.01); *B01F 15/00389* (2013.01); *B01F 15/00409* (2013.01); *B01F 2015/00636* (2013.01); *B01F 2215/0013* (2013.01)

(58) Field of Classification Search
None
See application file for complete search history.

(56) References Cited

U.S. PATENT DOCUMENTS

| | | | |
|---|---|---|---|
| 2,919,054 A | 12/1959 | Waller | |
| 3,482,821 A | 12/1969 | Blackwood | |
| 3,967,005 A | 6/1976 | Cattaneo | |
| 4,697,508 A * | 10/1987 | Tallafus | B65G 33/265 99/517 |
| 4,775,239 A | 10/1988 | Martinek et al. | |
| 5,228,775 A * | 7/1993 | Horn | B01F 7/08 366/278 |
| 5,866,201 A | 2/1999 | Blue | |
| 6,112,338 A | 9/2000 | Sundberg | |
| 6,290,383 B1 | 9/2001 | Shohet | |
| 6,397,571 B1 | 6/2002 | Ehrecke | |
| 7,906,166 B2 | 3/2011 | Wenger et al. | |
| 8,697,185 B2 | 4/2014 | Mizwicki et al. | |
| 9,004,743 B2 | 4/2015 | Wood et al. | |
| 9,346,464 B2 | 5/2016 | Gilbert et al. | |
| 9,751,058 B2 | 9/2017 | Bedord et al. | |
| 2002/0101781 A1 * | 8/2002 | Bump | A01K 5/002 366/141 |

(Continued)

*Primary Examiner* — Anshu Bhatia
*Assistant Examiner* — Gregory Y Huan
(74) *Attorney, Agent, or Firm* — Rebecca L. Henkel; Rickard K. DeMille

(57) ABSTRACT

Embodiments of the present disclosure include an agitating system of an agricultural system having a drive system configured to operate an agitator and a controller comprising a memory and a processor. The controller is configured to alternatingly instruct the drive system to operate the agitator in an active operation for an active time and instruct the drive system to suspend operation of the agitator for a dwell time after the active time.

12 Claims, 5 Drawing Sheets

(56) References Cited

U.S. PATENT DOCUMENTS

| | | | |
|---|---|---|---|
| 2008/0095910 A1* | 4/2008 | Wenger | B01F 7/00425 |
| | | | 426/557 |
| 2010/0220545 A1 | 9/2010 | Brown | |
| 2015/0027039 A1* | 1/2015 | Laskowski | C10L 5/445 |
| | | | 44/603 |
| 2015/0273731 A1 | 10/2015 | Fleury et al. | |

* cited by examiner

OPERATION OF AN AGRICULTURAL AGITATING SYSTEM

BACKGROUND

The present disclosure relates generally to an agitating system for an agricultural system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, agricultural seeding implements are towed behind a work vehicle, such as a tractor. These implements may contain a particulate material, such as seeds, fertilizer, and/or other agricultural product, which is distributed on or in the ground using various methods. Certain implementations include a storage tank in which the particulate material is stored and a metering system configured to meter the particulate material from the storage tank. The particulate material is distributed from the metering system to row units, which are configured to distribute the particulate material on or in the ground.

Unfortunately, the particulate material may form clumps within the storage tank. As a result, the particulate material may not flow evenly into the metering system. Accordingly, the particulate material may not be delivered to the field according to a target distribution pattern, thereby reducing the efficiency of the seeding process.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, an agitating system of an agricultural system has a drive system configured to operate an agitator and a controller comprising a memory and a processor. The controller is configured to alternatingly instruct the drive system to operate the agitator in an active operation for an active time and instruct the drive system to suspend operation of the agitator for a dwell time after the active time.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
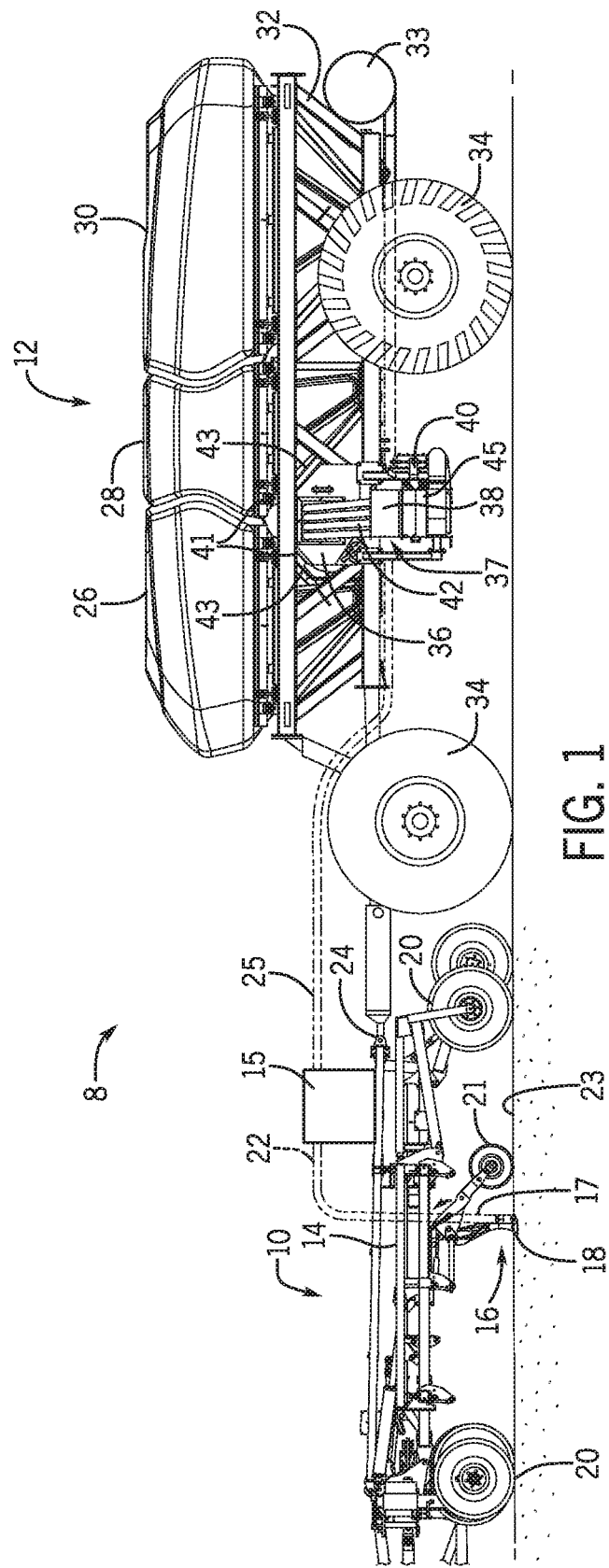
FIG. 1 is a side view of an embodiment of an agricultural system having an agricultural implement coupled to an air cart, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate to agricultural systems having an agitating system. Certain agricultural systems (e.g., air carts, implements, etc.) contain a particulate material (e.g., seeds, fertilizer, and/or other agricultural products) within a storage tank of the agricultural system. The agricultural system is configured to distribute the particulate material within a field. The particulate material may flow from the storage tank through a metering system, which is configured to control the flow of the particulate material to the field. In some circumstances, the particulate material may form clumps within the storage tank, which may cause uneven flow into the metering system. As such, the agricultural system may not deliver the particulate material onto the field in a desired distribution pattern.

Accordingly, the agricultural system may include an agitating system disposed upstream of the metering system with respect to a flow of particulate material in the agricultural system, in which the agitating system is configured to promote movement of the particulate material from the storage tank to the metering system. The agitating system may include an agitator configured to move (e.g., rotate) to promote movement of the particulate material from the storage tank to the metering system. In certain embodiments, the agitator is constantly moving during operation of the agricultural system. For example, during operation of the agricultural system, the agitator may be continuously driven (e.g., by a motor). However, continuously driving the agitator may result in excessive energy consumption.

Thus, in accordance with the present disclosure, the agitator of the agitating system may operate in active operations and inactive operations, in which the agitator is driven during the active operation, and the agitator is not driven during the inactive operation. For example, the agitator may be driven during the active operation for an active time. After each active operation, the agitator may not be driven during the inactive operation for a dwell time. After each dwell time, the agitator may be driven again for another active operation for the active time. Accordingly, the agitator may alternate between active operation and inactive operation to effectively agitate the particulate material and to promote movement of the particulate material to the metering system, while also avoiding overuse of the agitating system. Thus, operation of the agitating system may reduce heat and energy usage compared to an agricultural system that continuously drives the agitator, which would enhance a performance or longevity of the agitating system.

With the foregoing in mind, the present embodiments relating to agitating systems may be utilized within any suitable agricultural system. To help illustrate, FIG. 1 is a side view of an embodiment of an agricultural system 8 having an agricultural implement 10 coupled to an air cart 12. As depicted, the agricultural implement 10 includes a tool frame 14 coupled to a header 15, a row unit 16 having a particulate material tube 17 and an opener 18, and wheel assemblies 20. The agricultural implement 10 may be pulled by a work vehicle (e.g., a tractor) to deposit rows of particulate material (e.g., agricultural product) within the soil. Accordingly, the wheel assemblies 20 may contact the soil surface to enable the agricultural implement 10 to be pulled by the work vehicle. As the agricultural implement 10 is pulled, a row of the particulate material may be deposited in the soil by the row unit 16 (e.g., ground engaging opener assembly). Although only one row unit 16 is shown, the agricultural implement 10 may include multiple row units 16 (e.g., organized in a row across the agricultural implement 10). In some embodiments, the agricultural implement 10 may include a row of 12, 14, 16, 18, 20, or more row units 16, which may each deposit a respective row of particulate material into the soil.

To facilitate depositing the particulate material, each row unit 16 (e.g., ground engaging opener assembly) may include a press wheel 21. While the opener 18 engages the soil 23, the opener 18 exerts a force that excavates a trench into the soil 23 as the row unit 16 travels across the soil 23. The particulate material may be deposited into the excavated trench via the particulate material tube 17. Then, the press wheel 21 may pack soil onto the deposited particulate material. In certain embodiments, the press wheel may not directly be a part of the row unit. Instead, at least one press wheel may be mounted to the frame of the implement behind the at least one row unit. Furthermore, while the illustrated row unit includes a ground engaging opener assembly, in alternative embodiments, at least one row unit on the implement may include an applicator assembly configured to deposit particulate material onto the surface of the field, or any other suitable type of product deposition assembly.

The header 15 may provide the particulate material to the row units 16. In some embodiments, the header 15 may pneumatically distribute the particulate material from a primary line to secondary lines. In the illustrated embodiment, a primary line 25 directs particulate material from the air cart 12 to the header 15. Additionally, the header 15 is configured to distribute the particulate material to the row units 16 via respective secondary lines 22. In certain embodiments, multiple primary lines may direct particulate material to multiple headers. Moreover, multiple secondary lines may extend from each header to respective row units. Furthermore, in certain embodiments, at least one secondary line may extend to a secondary header, and multiple tertiary lines may extend from the secondary header to respective row units.

In the depicted embodiment, the air cart 12 is towed behind the agricultural implement 10. For example, the agricultural implement 10 may be coupled to the work vehicle by a first hitch assembly, and the air cart 12 may be coupled to the agricultural implement 10 by a second hitch assembly 24. However, in other embodiments, the agricultural implement may be towed behind the air cart. In further embodiments, the agricultural implement and the air cart may be part of a single unit that is towed behind the work vehicle, or may be elements of a self-propelled vehicle.

The air cart 12 may centrally store particulate material and distribute the particulate material to the header 15. Accordingly, as depicted, the air cart 12 includes three primary storage tanks 26, 28, and 30, an air cart frame 32, an air source 33, and wheels 34. Further, the air cart 12 includes an auxiliary or secondary storage tank 36, a fill hopper 38, an air supply 40, and product conveyance conduits 42. The second hitch assembly 24 is coupled between the tool frame 14 and the air cart frame 32, which enables the air cart 12 to be towed with the agricultural implement 10. Further, the fill hopper 38 enables an operator to fill the secondary storage tank 36. Accordingly, the fill hopper 38 is located on a side of the air cart 12 and at a level above the soil 23 that facilitates access by the operator (e.g., from ground level or from a bed of a truck). For example, an opening of the fill hopper 38, which receives the particulate material, may be located less than 5 feet (1.5 meters) above the ground. At this height, the operator may load the fill hopper 38 from ground level or from a truck bed, for example.

Additionally, the agricultural system 8 may include an agitating system 37 to agitate the particulate material within a storage tank. For purposes of discussion, this disclosure primarily refers to the agitating system 37 as being located in the secondary storage tank 36 to agitate the particulate material in the secondary storage tank 36. However, an agitating system may be located in one of the primary storage tanks 26, 28, 30 (e.g., in addition to or instead of the particulate material agitation control system in the secondary storage tank) to agitate the particulate material in the primary storage tank(s).

The primary storage tanks 26, 28, and 30, and the secondary storage tank 36 may store the particulate material (e.g., seeds, granular fertilizer, granular inoculants, etc.). In some embodiments, the primary storage tanks 26, 28, and 30 may each include a single large storage compartment for storing a single agricultural product. In certain embodiments, the primary storage tanks may each store a different agricultural product. For example, the first primary storage tank 26 may store legume seeds, and the second primary storage tank 28 may store a dry fertilizer. Additionally, in this example, the secondary storage tank 36 may store granular inoculants, which are planted in conjunction with the legume seeds. In such configurations, the air cart 12 may deliver seed, fertilizer, and inoculant to the agricultural implement 10 via separate primary lines, or as a mixture through a single primary line.

Further, as illustrated, the secondary storage tank 36 is positioned beneath portions of the primary storage tanks 26 and 28. To improve storage capacity of the secondary storage tank 36, upper walls 41 of the secondary storage tank 36 have slopes that substantially correspond to respective slopes of bottom portions 43 of the primary storage tanks 26 and 28. Therefore, the shape of the secondary storage tank 36 enables the secondary storage tank 36 to utilize a substantial portion of the space between the primary storage tanks 26 and 28. Similarly, in an alternative embodiment, the secondary storage tank may be positioned between the primary storage tanks 28 and 30.

The particulate material may be fed from the secondary storage tank 36 into the agitating system 37 into a metering system, which meters the particulate material, fluidizes the particulate material via a fluidizing airflow from the air source 33, and distributes the particulate material to the header 15 via the primary line 25. In some embodiments, the air source 33 may be one or more pumps and/or blowers powered by electric or hydraulic motor(s), for example. The agitating system 37 may be positioned at the bottom of the secondary storage tank 36 and above the metering system 45, and may be configured to facilitate movement of the particulate material into the metering system 45 from the secondary storage tank 36. For example, the agitating system 37 may break up clumped sections of particulate material to enable the particulate material to flow to the metering system 45.

Figure 2:
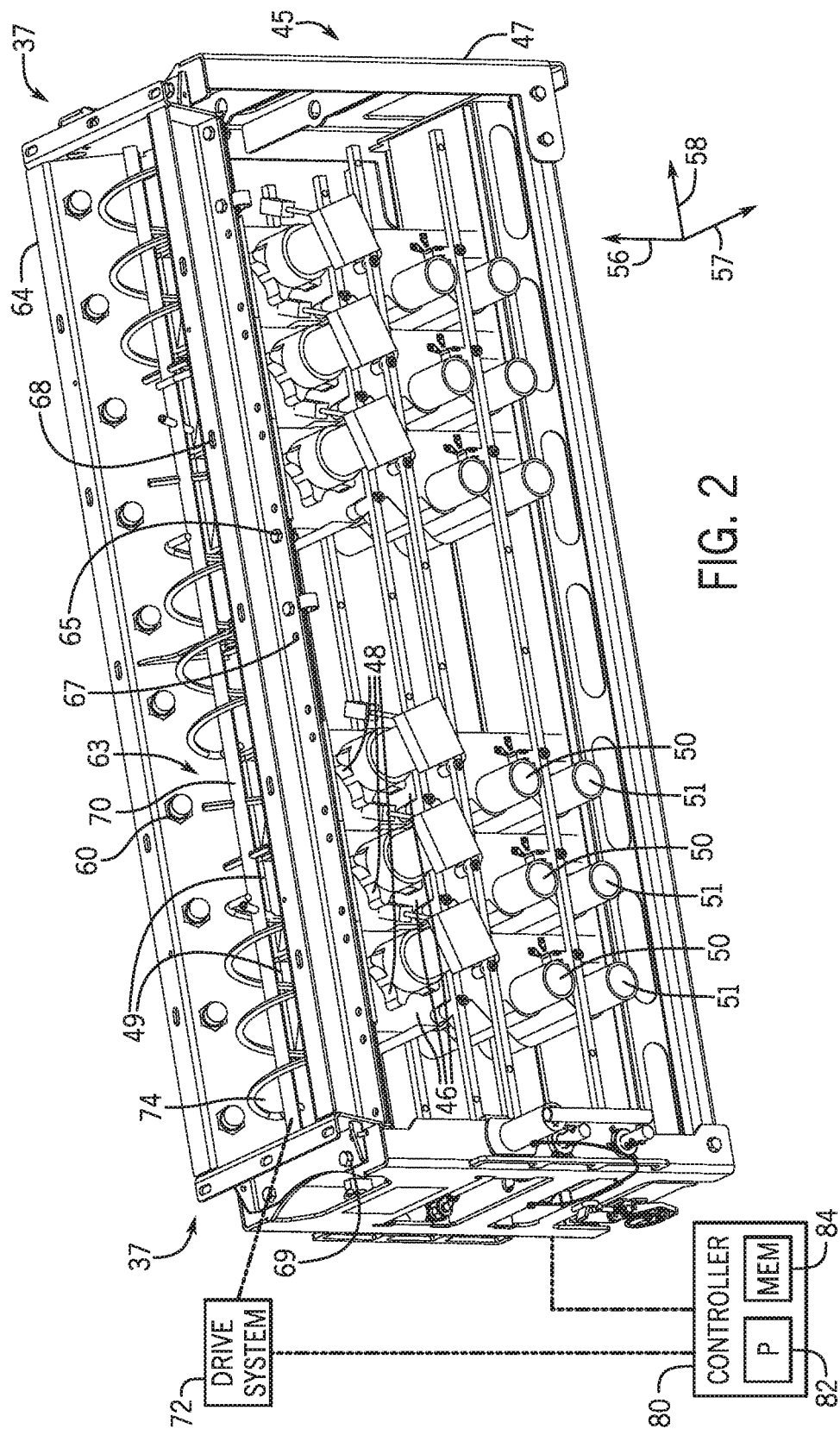
FIG. 2 is a perspective view of an embodiment of an agitating system that may be employed within the air cart of FIG. 1, in accordance with an aspect of the present disclosure.

FIG. 2 is a perspective view of an embodiment of an agitating system 37 that may be employed within the air cart 12 of FIG. 1. The agitating system 37 is positioned above the metering system 45. As illustrated, the metering system 45 includes multiple seed meters 46 supported by a frame 47. The metering system 45 may include 1 to 10, or more than 10 (e.g., 15), seed meters 46. In the illustrated embodiment, each seed meter 46 includes at least one respective metering device 48 (e.g., meter roller) to control flow of the particulate material to a respective primary conduit. Each seed meter 46 also includes an inlet 49 configured to receive the particulate material from the agitating system 37 (e.g., along a vertical axis 56). Furthermore, each seed meter 46 includes a first conduit connector 50 and a second conduit connector 51. Each conduit connector 50, 51 is configured to receive air flow from the air source and the particulate material from the metering device 48, thereby producing the air/material mixture. First primary conduits may be coupled to the first conduit connectors 50, and second primary conduits may be coupled to the second conduit connectors 51. Furthermore, the metering system 45 may include a gate 52 that enables selection of the first conduit connector 50 or the second conduit connector 51. Once the first conduit connector 50 or the second conduit connector 51 is selected, particulate material flows through the selected conduit connector 50, 51. The primary conduits may be coupled to respective headers that provide particulate material to multiple row units.

In the illustrated embodiment, the agitating system 37 includes a sub-hopper 64, which may be considered a part of the secondary storage tank. The sub-hopper 64 is secured to the metering system 45 (e.g., the frame 47 of the metering system 45) by fasteners 65 disposed through holes 67, 69 of the sub-hopper 64. The first holes 67 are generally aligned along a length of the sub-hopper 64 along a longitudinal axis 58, and the second holes 69 are arranged along a width of the sub-hopper 64 along a lateral axis 57. The sub-hopper 64 also includes third holes 68 configured to receive fasteners for securing the sub-hopper 64 to a structure of the secondary storage tank or another portion of the agricultural system (e.g., the air cart 12). Additionally or alternatively, the sub-hopper may be coupled to the frame and the secondary storage tank by other suitable devices, such as welds, tabs, and the like.

Generally, the particulate material may flow downwardly through the secondary storage tank 36 to the metering system 45 via the agitating system 37. That is, the particulate material may flow through the sub-hopper 64 into the inlets 49 of the seed meters 46. In some embodiments, the particulate material may pass through other features of the agricultural system (e.g., of the air cart 12) before entering the metering system 45.

In the illustrated embodiment, the agitating system 37 includes sensors 60. As illustrated ten sensors 60 are placed along a wall of the sub-hopper 64 (e.g., along the longitudinal axis 58). However, more or fewer sensors may be employed in alternative embodiments. For example, certain embodiments may include 1, 2, 3, 4, 6, 8, 10, 12, 14, or more sensors. Each of the sensors 60 is configured to detect a presence of particulate material at the location or position of the respective sensor. As such, the sensors 60 may determine a profile of particulate material disposed in the sub-hopper 64 and/or the secondary storage tank 36 before, during, and/or after operation of the agricultural system. A variety of sensor(s), such as ultrasonic sensor(s), electrostatic sensor(s), inductive sensor(s), capacitor sensor(s), Light Detection and Ranging (LIDAR) sensor(s), and/or other suitable sensor(s) may be used alone or in combination with one another to determine the profile of the particulate material. The sensor(s) may also include one or more camera(s) disposed in the sub-hopper 64 and/or secondary storage tank 36, in which the camera(s) may be configured to detect the profile. Additionally or alternatively, one or more sensor(s) may be disposed higher in the agitating system or above the agitating system (e.g., along the vertical axis 56). As illustrated in FIG. 2, the sensors 60 are aligned in a row above an agitator 63. However, the sensors may be disposed in other suitable configurations/arrangements in the agitating system and/or secondary storage tank. In certain embodiments, the agitating system may not include any sensors, and thus, may not determine the profile of the particulate material.

The agitator 63 of the agitating system 37 is disposed within the sub-hopper 64 and extends along the longitudinal axis 58 in an area below the sensors 60 along the vertical axis 56. In certain embodiments, the agitating system may be mounted higher in the secondary storage tank relative to the sub-hopper. For example, the agitating system may be disposed above the sub-hopper, such as within the structure of the secondary storage tank. As the particulate material rests in the secondary storage tank, the particulate material may clump together to form pieces that are larger than desired (e.g., larger than the openings of the inlets 49). When the particulate material flows through the agitating system 37 (e.g., while the agitating system 37 is operating), the clumps of particulate material break into smaller pieces more suitable for flowing through the metering system 45.

The agitator 63 includes a shaft 70 coupled to a drive system 72, and the agitator 63 includes an agitator coil 74 coupled to the shaft 70. In the illustrated embodiment, the agitator coil 74 is wrapped around the shaft 70 and is configured to enable the particulate material to flow between the shaft 70 and the agitator coil 74. Although this disclosure primarily discusses the agitator coil 74 as wrapped in a helical form, in additional or alternative embodiments, the agitator coil may be wrapped in a cylindrical form, a conical form, another suitable form, or any combination thereof, around the shaft. Additionally or alternatively, the agitator may include fingers or protrusions that extend from the shaft, in which movement of the fingers or protrusions induce movement of the particulate material. The agitator may include a certain configuration of fingers or protrusions, such as a concentration (e.g., a number per unit length) of fingers or protrusions, a length of each finger or protrusion, a shape of each finger or protrusion, a position of the fingers or protrusions, and so forth, that may vary along the length of the shaft. Furthermore, there may be more than one agitator coil coupled to the shaft at different locations along the length of the shaft. In the illustrated embodiment, the agitator 63 may rotate to move particulate material in the sub-hopper 64 and/or the secondary storage tank. The agitator 63 may be configured to rotate in either direction to move the particulate material toward each longitudinal side of the sub-hopper 64. In embodiments of the agitating system having more than one agitator, multiple drives may be coupled to the respective agitator (e.g., the shafts) to enable movement of each agitator to be independently controllable. In certain embodiments, other types of agitators may be used in the agitating system. For example, an agitator may move linearly in the sub-hopper (e.g., along the longitudinal axis 58) to agitate the particulate material.

The drive system 72 of the agitating system 37 may be configured to drive the agitator 63 to rotate, such as via a motor (e.g., an electric motor, hydraulic motor, etc.). In the illustrated embodiment, the drive system 72 includes a single motor disposed at an end of the sub-hopper 64. However, additional or alternative embodiments of the drive system may include more than one motor (e.g., 2, 3, 4, 5, etc.). For example, the drive system may include a motor disposed at each longitudinal end of the sub-hopper (e.g., along the longitudinal axis 58). The drive system may also include motor(s) disposed along the length of the sub-hopper. Motor(s) disposed along the length of the sub-hopper may be connected to the agitator and may be configured to drive the agitator. As the agitator 63 turns, the agitator agitates the particulate material moves within the sub-hopper 64.

In the illustrated embodiment, the agitating system 37 includes a single agitator 63. In certain embodiments, multiple agitators (e.g., 2, 3, 4, 5, 6, 7, 8, etc.) may be disposed in the sub-hopper and/or the secondary storage tank. The agitators may be disposed in series or in parallel. In a configuration with more than one agitator, drive system(s) may drive only a portion of the agitators or all of the agitators to agitate the particulate material. Multiple agitators may also be disposed at different levels in the sub-hopper and/or secondary storage tank. For example, one or more agitator(s) may be disposed in the sub-hopper and one or more agitator(s) may be disposed higher in the secondary storage tank.

In some embodiments, the agricultural system 8 includes a controller 80 that is communicatively coupled to the agitating system 37. The controller 80 may control operation of the agitating system 37, such as rotation of the agitator 63 by controlling the drive system 72. The controller 80 includes a processor 82 configured to execute software code or instructions stored on a memory 84. Moreover, the controller 80 is communicatively coupled to the sensors 60 and the drive system 72 to enable operation of the drive system 72 based on feedback from the sensors 60. The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

As an example, the memory 84 may store processor-executable software code or instructions (e.g., firmware or software), which are tangibly stored on a tangible computer readable medium. Additionally or alternatively, the memory 84 may store data (e.g., information regarding operation of the agitating system 37). As an example, the memory 84 may include a volatile memory, such as random access memory (RAM), and/or a nonvolatile memory, such as read-only memory (ROM), flash memory, a hard drive, or any other suitable optical, magnetic, or solid-state storage medium, or a combination thereof. Furthermore, the processor 82 may include multiple microprocessors, one or more "general-purpose" microprocessors, one or more special-purpose microprocessors, and/or one or more application specific integrated circuits (ASICS), or some combination thereof. For example, the processor 82 may include one or more reduced instruction set (RISC) or complex instruction set (CISC) processors. The processor 82 and/or memory 84, and/or an additional processor and/or memory, may be located in any suitable portion of the agricultural system. For instance, a memory may be located in the drive system 72.

Figure 3:
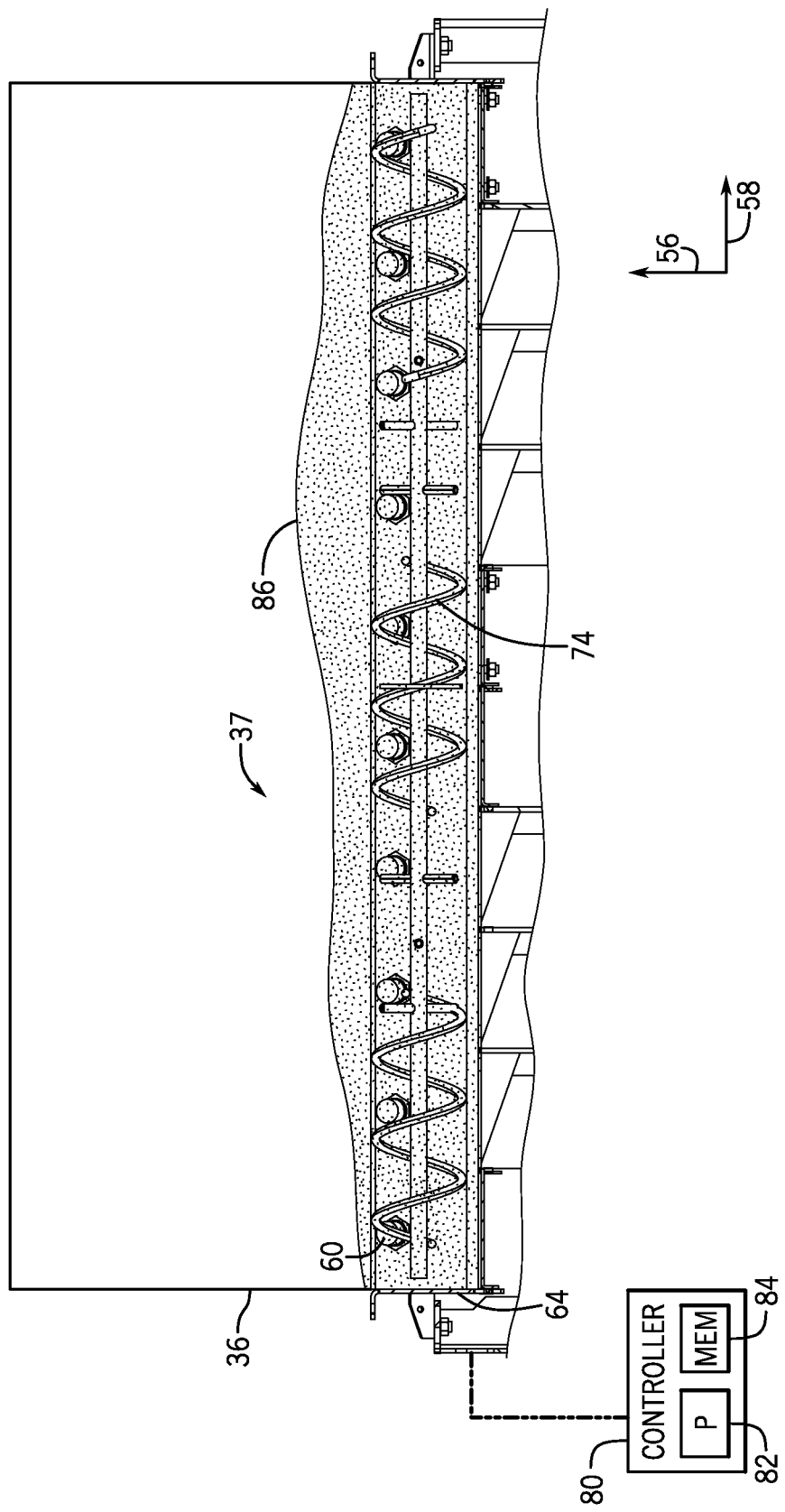
FIG. 3 is a cross-sectional side view of the agitating system of FIG. 2 with particulate material disposed therein, in accordance with an aspect of the present disclosure.

FIG. 3 is a cross-sectional side view of the agitating system 37 of FIG. 2 with particulate material 86 disposed therein. The particulate material is disposed at various levels within the sub-hopper 64 along the longitudinal axis 58, thereby establishing a particular profile. In the illustrated embodiment, the particulate material 86 extends from the secondary storage tank 36 to the sub-hopper 64, and the particulate material 86 is approximately level in the secondary storage tank 36 such that the particulate material 86 is distributed across the sensors 60 along the longitudinal axis 58. However, during operation of the agricultural system, particulate material may be distributed in an uneven profile, such as above, partially above, below, or partially below certain sensors 60.

The sensors 60 may determine the profile of the particulate material 86 in the sub-hopper 64 and/or the secondary storage tank 36 based on the position of the particulate material 86 as detected by the sensors 60. The profile is the shape of the top surface of the particulate 86 material disposed in the sub-hopper 64 and/or the secondary storage tank 36 and may be one-dimensional (e.g., along the longitudinal axis 58) or two-dimensional. Additionally, the profile may include a series of levels in which each level spans a portion of the width of the sub-hopper 64 or the secondary storage tank 36. For example, each sensor 60 may detect a presence of the particulate material 86 in the sub-hopper 64 and/or the secondary storage tank 36 proximate to the sensor. Based on the number of sensors 60 that detect the presence of particulate material 86, the width of each level of the particulate material 86 may be determined. In certain embodiments, the sensors 60 may be communicatively coupled to the controller 80 and, thus, may output signals indicative of the detected levels of particulate material 86 to the controller 80. The controller 80 may determine the profile of particulate material 86 based on the detected levels (e.g., by linearly extrapolating the data points or by another suitable method). Alternatively, a single sensor may be used alone or in combination with other sensors to determine the profile of the particulate material 86. For example, a single LIDAR sensor (e.g., mounted near a top portion of the secondary storage tank 36) may be configured to determine the profile. Further still, instead of utilizing sensors configured to detect a presence of particulate material 86, the agitating system may be configured to determine the profile of particulate material based on another operating parameter. For example, the agitating system may be configured to monitor a load (e.g., weight) exerted by the particulate material onto the secondary storage tank, the agitator, and/or the sub-hopper to determine the profile of particulate material. In additional or alternative embodiments, the agitating system may be configured to monitor a torque on a motor of the drive system to determine and/or facilitate determination of the profile.

With the determined profile, the controller 80 may determine an appropriate operating mode for the agitating system 37. For example, the controller 80 may be configured to operate the agitating system 37 in different operating modes. As used herein, an operating mode of the agitating system 37 refers to an operation of the agitating system 37 in a particular manner to interact with the particulate material 86 within the sub-hopper 64 and/or secondary storage tank 36, such as to adjust the profile of the particulate material 86 in the secondary storage tank 36 and/or in the sub-hopper 64. For example, the controller 80 may instruct the agitating system 37 to operate in an agitation mode or leveling mode.

Operating the agitating system 37 in the agitation mode breaks up clumps of the particulate material 86 within the secondary storage tank 36, and/or within the sub-hopper 64, such that a substantially even flow of particulate material 86 is provided to the metering system 45 (e.g., to enable the particulate material to flow through the inlets of the metering system 45) In the agitation mode, the drive system 72 may be operated to limit a consumption of energy while effectively inducing movement of the particulate material 86 to flow from the secondary storage tank 36 to the metering system 45. In certain embodiments, the controller 80 may also instruct the agitating system 37 to operate in other modes, such as a leveling mode, that may adjust the profile of the particulate material 86 (e.g., along the longitudinal axis 58) based on feedback from the sensors 60. In alternate embodiments, the controller may only instruct the agitating system 37 to operate in the agitating mode (e.g., the agitating system does not include sensors).

Figure 4:
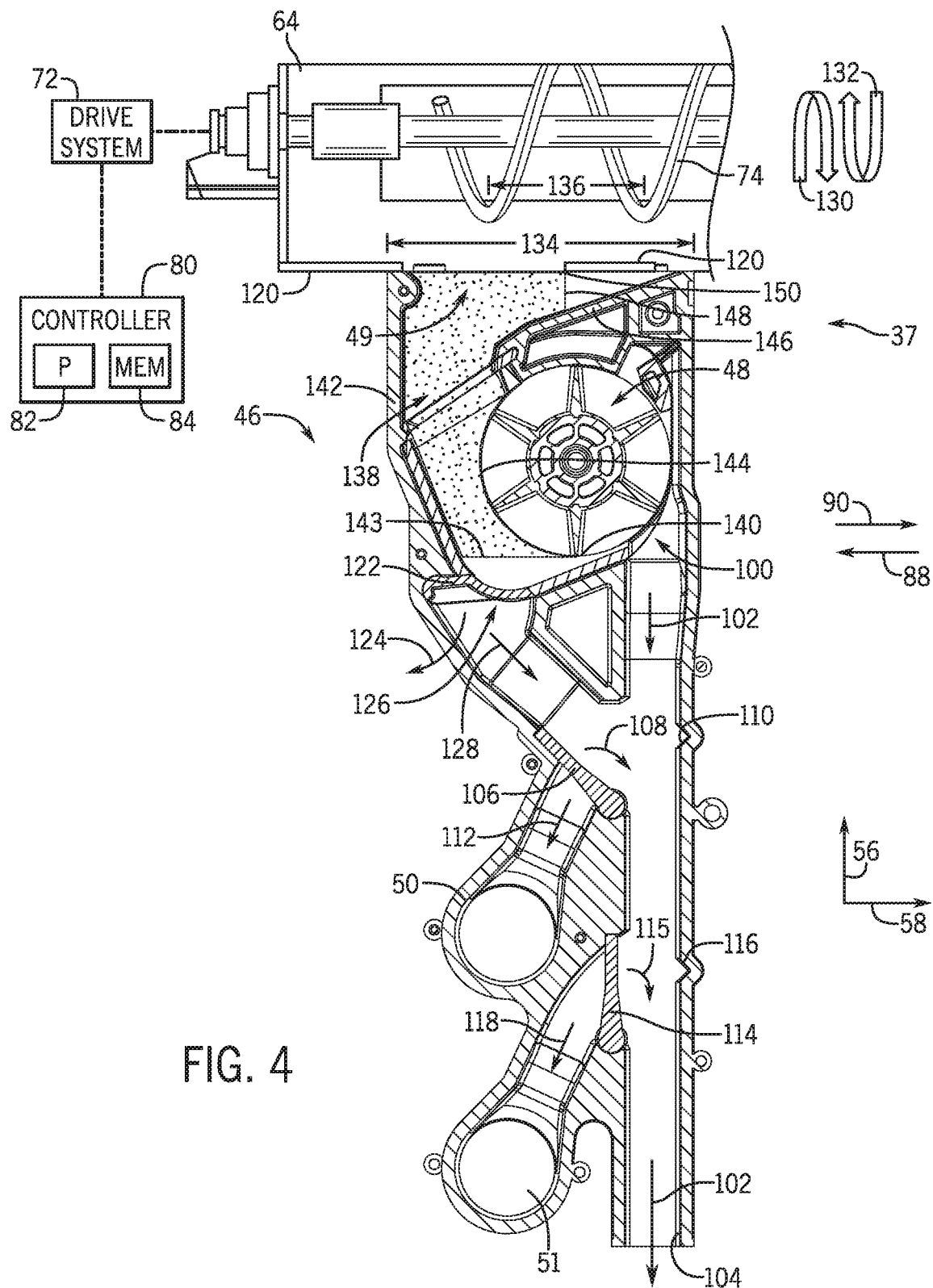
FIG. 4 is a cross-sectional side view of a portion of the agitating system positioned above a seed meter of an embodiment of a metering system, in accordance with an aspect of the present disclosure.

FIG. 4 is a cross-sectional side view of a portion of the agitating system 37 of FIGS. 2 and 3 positioned above a seed meter 46 of an embodiment of the metering system 45. The agitating system 37 may enable the particulate material to flow to the seed meter 46 via the inlet 49, and movement of the particulate material through a remainder of the seed meter 46 may be controlled by the metering device 48. As illustrated, the metering device 48 is configured to control a flow of the particulate material into the first conduit connector 50 or into the second conduit connector 51 via rotation of the metering device 48.

To determine a relationship between a particulate material flow rate (e.g., into the first conduit connector 50 or into the second conduit connector 51) and rotation of the metering device 48, the metering device 48 may be calibrated (e.g., prior to operation of the air cart, periodically, etc.). The calibration process includes rotating the metering device 48 through a number of rotations, weighing the particulate material output by the metering device 48, and then dividing the particulate material weight by the number of rotations to determine a product flow rate (e.g., product weight per metering device rotation). For example, the metering device 48 may be driven to rotate such that particulate material flows through an opening 100 in a downward direction 102. The particulate material then exits the seed meter 46 in the downward direction 102 through an outlet 104. An operator may collect the particulate material output through the outlet 104, weigh the particulate material, and then determine the product flow rate (e.g., based on the number of metering device rotations that produced the particulate material output).

In certain embodiments, the operator may open a first gate 106 to direct the particulate material into the first conduit connector 50 (e.g., if particulate material flow into the first conduits is desired). As illustrated, the first gate 106 may be rotated in a first rotational direction 108 from the illustrated closed position, which blocks flow into the first conduit connector 50, to an open position, which facilitates flow into the first conduit connector 50. With the first gate 106 in the open position, the first gate 106 engages a first recess 110 in the seed meter 46, thereby directing the flow of particulate material from the downward direction 102 into the first conduit connector 50 in a first direction 112 and blocking the flow of particulate material through the outlet 104. Upon completion of seeding operations, or if particulate material flow into the second conduit connector 51 is desired, the first gate 106 may be returned to the closed position, as illustrated.

If particulate material flow into the second conduits is desired, the operator may open a second gate 114 to direct the particulate material into the second conduit connector 51. As illustrated, the second gate 114 may be rotated in a second rotational direction 115 from the illustrated closed position, which blocks flow into the second conduit connector 51, to an open position, which facilitates flow into the second conduit connector 51. With the second gate 114 in the open position, the second gate 114 engages a second recess 116 in the seed meter 46, thereby directing the flow of particulate material from the downward direction 102 into the second conduit connector 51 in a second direction 118 and blocking the flow of particulate material through the outlet 104. Upon completion of seeding operations, or if particulate material flow into the first conduit connector 50 is desired, the second gate 114 may be returned to the closed position, as illustrated.

Once seeding operations are complete, a slide gate 120 positioned above the inlet 49 may be transitioned to a closed position to block particulate material flow into the seed meter 46 from the secondary storage tank 36. The material remaining in the seed meter 46 may then be discharged via a clean-out process. The clean-out process includes closing the first and second gates 106, 114, and opening a third gate 122. As illustrated, the third gate 122 may be rotated in a third rotational direction 124 from the illustrated closed position, which blocks material from bypassing the metering device 48, to an open position, which creates an opening 126. The opening 126 enables particulate material to bypass the metering device 48 and flow in a third direction 128 toward the outlet 104, thereby discharging the remaining material from the seed meter 46. During the clean-out process, it is desirable to maintain the first gate 106 and the second gate 114 in the closed position such that the remaining particulate material does not enter the first conduit connector 50 or the second conduit connector 51.

As mentioned, one operating mode of the agitating system 37 is an agitation mode, in which the particulate material in the secondary storage tank and/or the sub-hopper 64 is agitated. For example, the agitating system 37 may operate in the agitation mode when the amount of particulate material in the secondary storage tank exceeds a threshold amount (e.g., a threshold volume), when the particulate material is at a desirable profile, and the metering system 45 is in operation.

Due to the helical geometry of the agitator coil 74, rotation of the agitator 63 may shift particulate material along the longitudinal axis 58. In the illustrated embodiment, rotating the agitator 63 along a first rotational direction or a forward rotational direction 130 generally shifts particulate material in a first longitudinal direction 88, and rotating the agitator 63 in a second rotational direction or a reverse rotational direction 132 generally shifts particulate material along a second longitudinal direction 90, opposite the first longitudinal direction 88. In some embodiments, the agitator may be rotated in cycles. That is, the agitator 63 may rotate in the forward rotational direction 130 for a period of time, then rotate in the reverse rotational direction 132 for another period of time. Such cyclic rotation of the agitator coil 63 may stimulate the particulate material to break up clumps of the particulate material. Moreover, cyclic rotation of the agitator 63 in the forward and reverse rotational directions for equal times may substantially maintain the profile of the particulate material along the longitudinal axis 58. For example, rotation of the agitator 63 in the forward rotational direction 130 may initially move a portion of the particulate material in the first longitudinal direction 88, and rotation of the agitator 63 in the reverse rotational direction 132 may move the portion of the particulate material back in the longitudinal direction 90, such that the particulate material may not have an overall movement along the longitudinal axis 58.

As discussed herein, constant rotation of the agitator 63 to rotate may utilize a significant amount of energy. Thus, to limit rotation of the agitator 63, the controller 80 may instruct the drive system 72 to alternate between an active operation and an inactive operation. During active operation, the controller 80 instructs the drive system 72 to rotate the agitator 63 in either the forward rotational direction 130 or the reverse rotational direction 132 for an active time. The rotation of the agitator 63 may induce the particulate material to move through the sub-hopper 64, and may break up clumps of the particulate material. During inactive operation, the controller 80 instructs the drive system 72 not to rotate the agitator 63 for a dwell time, and thus a position or orientation of the agitator coil 74 may be substantially maintained. During inactive operation, some of the particulate material may continue to move through the sub-hopper 64 toward the inlets 49 of the metering system 45 due to gravitational force. After the inactive operation, the controller 80 may instruct the drive system 72 to rotate the agitator 63 in another active operation, in which particulate material is moved back by rotating the agitator 63 in the opposite direction of the previous active operation. In some embodiments, each active time of the active operation is long enough to move the agitator coil 74 across the inlet 49. Thus, less energy is consumed compared to continuously operating the drive system 72 to move the agitator 63.

In certain embodiments, the controller 80 may instruct the drive system 72 to operate actively and inactively for specific intervals of time. During the active operation, the drive system 72 drives the agitator 63 for a sufficient time (e.g., forward time or reverse time) to cause the agitator coil 74 to move a particle of the particulate material along a length 134 of the inlet 49 of the seed meter 46. Thus, the forward time depends on a movement speed (e.g., rotation speed) of the agitator coil 74 in the forward rotational direction 130, and the reverse time depends on a movement speed (e.g., rotation speed) of the agitator coil 74 in the reverse rotational direction 132.

As such, the forward time depends on a rotational speed of the agitator coil 74 in the forward rotational direction 130, the length 134 of the inlet 49 of the seed meter, and a pitch 136 of the agitator coil 74, (e.g., a distance between loops of the agitator coil 74 along the longitudinal axis 58). Likewise, the reverse time depends on a rotational speed of the agitator coil 74 in the reverse rotational direction 132, the length 134 of inlet 49 of the seed meter 46, and the pitch 136 of the agitator coil 74. In some embodiments, pitches 136 may be different in the forward rotational direction 130 relative to the reverse rotational direction 132. As an example, the forward time and the reverse time may be represented by the following equation:

$$t_a = \frac{60 * w}{p * s} \qquad \text{Equation 1}$$

in which $t_a$ is the forward time or reverse time in seconds (s), w is the length 134 in millimeters (mm), p is the pitch 136 in mm, and s is the corresponding rotational speed of the agitator coil 74 in revolutions per minute. Thus, if the forward rotational speed and the reverse rotational speed are equal and the pitch 136 in the forward rotational direction 130 and the pitch 136 in the reverse rotational direction are equal, then the forward time and the reverse time are equal. By way of example, the forward time and the reverse time may each be 2 seconds to 15 seconds. However, in additional or alternative embodiments, the forward time and the reverse time may be different from one another (e.g., if the forward rotational speed is different from the reverse rotational speed). Additionally, in certain aspects, instead of using the pitch 136 and/or the rotational speed of the agitator coil 74, the forward and reverse times may be determined using a different technique (e.g., based on the geometry of the agitator 63 and/or an operational parameter of the agitating system 37). For example, in embodiments in which the agitator is linearly translated, $t_a$ may be determined based on a linear speed of the agitator 63. In additional or alternative embodiments, the controller 80 may determine $t_a$ based on other factors, relationships, or parameters.

The time calculated in Equation 1 may be considered the desired active time for operating the drive system 72 to agitate the particulate material to promote the particulate material traveling through the sub-hopper 64 into the inlets 49 of the seed meters 46. That is, operating the drive system 72 for an active time shorter than $t_a$ may not achieve full agitation of the particulate material over the length 134 of the inlet 49 of the seed meter 46. Additionally, operating the drive system 72 for an active time longer than $t_a$ may consume more energy than desired to agitate the particulate material.

In certain embodiments, the dwell time in which the drive system 72 is inactive may correspond to a time sufficient for the metering device 48 to move an amount of particulate material within a metering zone 138. In other words, the dwell time may correspond to an amount of time that the metering device 48 utilizes to empty a metering zone 138 full of the particulate material. As used herein, the metering zone 138 is an area in the seed meter 46 in which the particulate material is not agitated by the agitating system 37, and which the particulate material may flow to the metering device 48. In some embodiments, the metering zone 138 is located below the slide gate 120 and above a bottom 140 of the metering device 48. As seen in FIG. 4, the metering zone 138 may be bounded by the inlet 49 (e.g., while the slide gate 120 is in an opened position), a wall 142 of the seed meter 46, a line 143 extending tangentially (e.g., horizontally) from the bottom 140 of the metering device 48 toward the wall 142, an edge 144 of the metering device 48, an overhang 146 of the seed meter 46 extending over the metering device 48, and a line 148 extending approximately vertically between an edge 150 of one of the inlets 49 and the overhang 146.

In addition to the geometry of the metering zone 138, the dwell time may be based on a bulk density of the particulate material and the mass flow rate of the particulate material through the seed meter 46. An equation to determine the dwell time may be represented by the following equation:

$$t_d = \frac{V * \rho}{\dot{m}} \quad \text{Equation 2}$$

in which $t_d$ is the dwell time in seconds (s), V is the volume of particulate material in the metering zone 138 in $m^3$, $\rho$ is the bulk density of the particulate in kilograms per cubic meter ($kg/m^3$), and to is the mass flow rate of the particulate material through the metering zone 138 in kg/s. In certain embodiments, the dwell time may be around 50 seconds to 70 seconds. During the dwell time, the agitating system 37 (e.g., the drive system 72) may be inactive and, thus, the dwell time may enable the drive system 72 to cool down between active operations, thereby maintaining the drive system 72 at a desired temperature and reducing energy consumption. Equation 2 results in a constant dwell time to for a particular particulate material and mass flow rate. However, in additional or alternative embodiments, the controller 80 may establish different dwell times (e.g., based on relationships of other factors). In one example, the controller may establish a first dwell time after a forward rotation and a second dwell time, different than the first dwell time, after a reverse rotation. In another example, the controller may adjust the dwell time during operation of the agitating system, such as based on a level of the particulate material in the secondary storage tank. The controller may alternatively determine the forward time, reverse time, and/or the dwell time in other suitable manners, and then operates the drive system at the determined forward time, reverse time, and dwell time.

Although this disclosure primarily discusses determining the active time and the dwell time via Equations 1 and 2, respectively, in additional or alternative embodiments, the active time and/or dwell time may be determined via other methods. In a non-limiting embodiment, the active time and/or dwell time may be determined based on an actual performance of the agitating system, which may be detected via the sensors. For example, with regard to the active time, the sensors may determine an amount of particulate material directed through the sub-hopper during the forward and/or reverse rotation of the agitator coil, and the controller may set the active time based on the determined amount. As an example, the controller may set the forward time and the reverse time based on a respective time that is sufficient for the agitator to move a particle of the particulate material to move across one of the inlets of the seed meters, as may be determined by the sensors. For the dwell time, the sensors may determine an amount of particulate material directed through the seed meter and/or an amount of particulate material in the metering zone during the duration of the dwell time, and the controller may set the dwell time based on the determined amounts. As such, the controller uses sensor feedback to determine the amount of time taken to empty the metering zone 138 full of particulate material. In such embodiments, the controller may dynamically adjust the active time and/or dwell time during operation of the agitating system.

With the active time $t_a$ and the dwell time $t_d$ determined, the agitating system 37 may operate to agitate the particulate material while reducing usage of the drive system 72. For example, the controller 80 may operate the drive system 72 to rotate the agitator 63 in the forward rotational direction 130 for a first active time (e.g., forward time) to agitate the particulate material in the secondary storage tank 36 and/or the sub-hopper 64. As a result, a portion of the particulate material in the secondary storage tank 36 and/or the sub-hopper 64 moves along the first longitudinal direction 88 and downward through the inlet 49 and into the metering zone 138 of the seed meter 46. The controller 80 may then suspend operation of the drive system 72 for the dwell time, while the metering device 48 continues to move the particulate material in the metering zone 138 through the seed meter 46. After the dwell time, the controller 80 may operate the drive system 72 to rotate the agitator 63 in the reverse rotational direction 132 for a second active time (e.g., reverse time) to agitate the particulate material in the secondary storage tank 36 again. During the second active time, a portion of the particulate material in the secondary storage tank 36 and/or the sub-hopper 64 moves along the second longitudinal direction 90 and downward through the inlet 49 and into the metering zone 138. Subsequent to the second active time, the controller 80 may again suspend operation of the drive system 72 for the dwell time as the metering device 48 continues to direct the particulate material in the metering zone 138 through the seed meter 46. When the dwell time has elapsed again, the controller 80 may then activate the drive system 72 to rotate the agitating system 37 in the forward rotational direction 130 to begin the cycle again.

Figure 5:
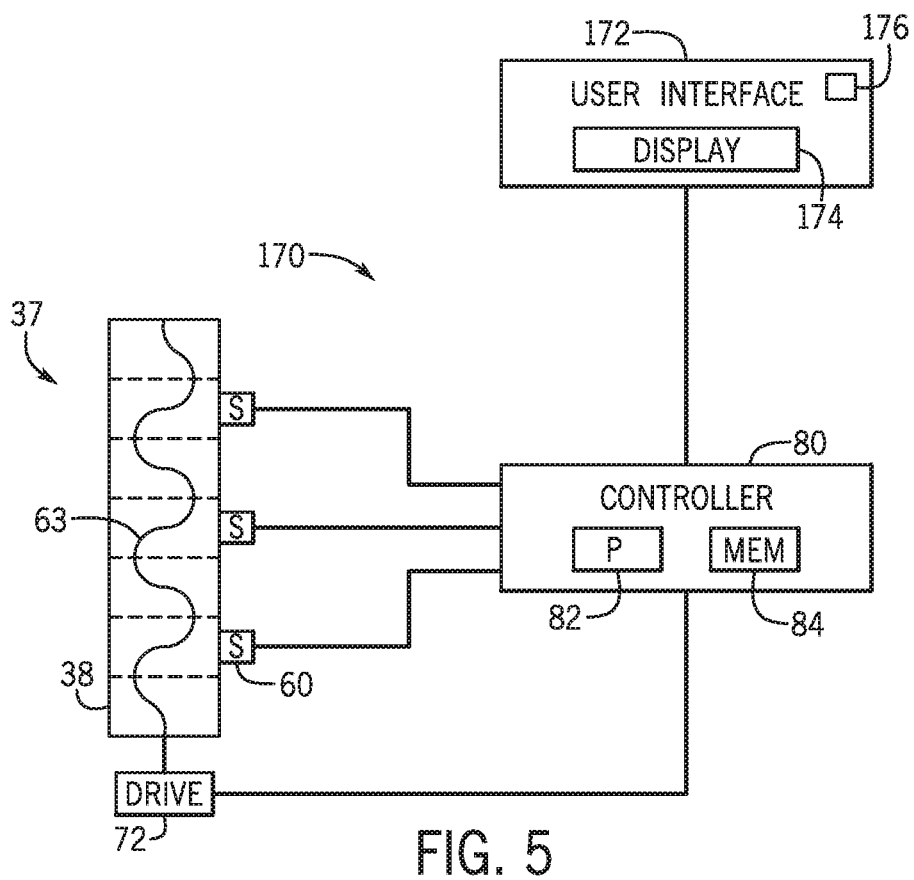
FIG. 5 is a schematic view of an embodiment of an agitating system that may be employed within the air cart of FIG. 1, in accordance with an aspect of the present disclosure.

FIG. 5 is a schematic view of an embodiment of an agitating system 37 that may be employed within the air cart 12 of FIG. 1. In the illustrated embodiment, the agitating system 44 includes a control system 170 having a user interface 172 communicatively coupled to the controller 80. The controller 80 may output signal(s) to the user interface 172 indicative of operation of the agitating system 37. By way of example, the user interface 172 includes a display 174, which may present visual information to an operator, such as a graph depicting operation of the agitating system 37. Based upon this display of information, the operator may manually operate the agricultural system, such as the agitating system 37. In the illustrated embodiment, the user interface 172 includes a user interaction device 176, such as a button, a keyboard, a microphone, a mousing device, a trackpad, and the like, to enable user input. The user input may be associated with adjusting operation of the agricultural system, such as operation of the agitating system 37.

In some embodiments, the operator may input certain parameter values (e.g., the length across the respective inlets of each seed meter, the pitch of the agitator coil, the bulk density of the particulate material, etc.) of the agitating system 37, and the controller 80 may determine the active time and/or the dwell time based on the input values. For instance, the controller 80 may utilize the input parameter values within Equation 1 and/or Equation 2 to determine the active time and/or the dwell time, respectively. Additionally or alternatively, the controller may utilize a lookup table, chart, or graph to determine the active time and/or the dwell time (e.g., based on the input parameter values). In another example, the operator may directly input the active time and dwell time values. As such, the operator may override the time(s) determined by the controller, and the controller may implement the active time and the dwell time based on the inputted active time and dwell time values.

Figure 6:
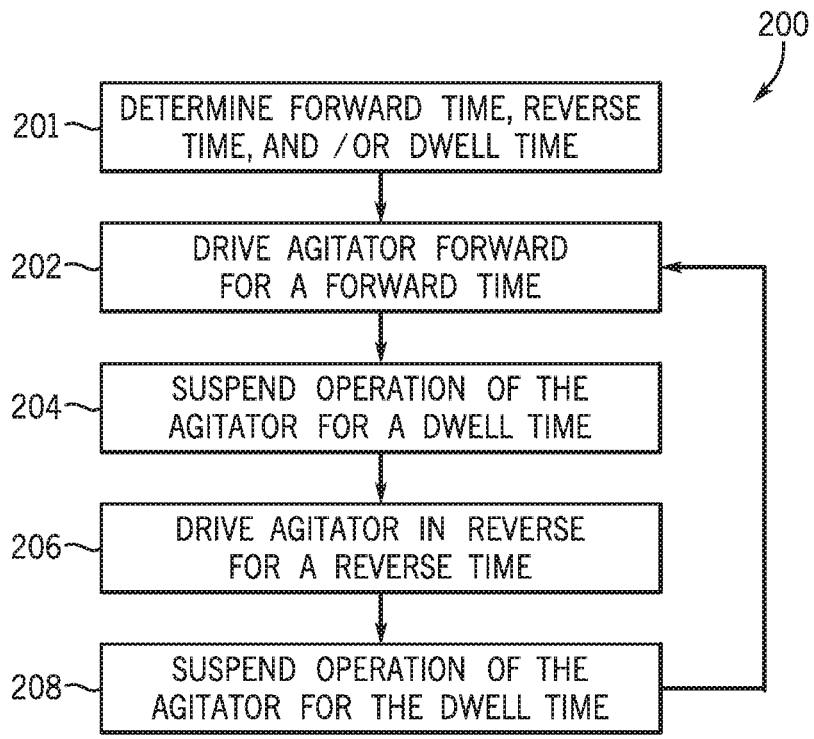
FIG. 6 is a flow diagram of an embodiment of a method to control the agitating system, in accordance with an aspect of the present disclosure.

FIG. 6 is a flow diagram of an embodiment of a method 200 to operate the agitating system 37 and agitate the particulate material. As an example, one or more controllers, such as the controller 80, may perform the steps of the method 200. In general, the method 200 may be performed to promote movement of the particulate material through the storage tank, such as the secondary storage tank through the sub-hopper, and into one of the seed meters.

At block 201, the controller determines the forward time, the reverse time, and/or the dwell time. In some embodiments, the controller may determine the respective times based on user input, which may include time inputs of which the controller may select as the respective times, or may include parameters of the agitating system, of which the controller may use to derive the respective times (e.g., via Equations 1 and/or 2). Additionally or alternatively, the controller may determine the respective times based on feedback from one or more sensor(s). Although FIG. 6 depicts that the step of block 201 may be performed once during operation of the agitating system, the controller may determine the respective times in multiple instances while the agitating system is in operation. For example, the controller may operate the agitating system at initially determined times, and, based on feedback from sensors, may adjust the determined times to operate the agitating system at the adjusted times.

At block 202, after the controller determines the respective times at which to operate the agitating system, the controller operates the drive system to drive the agitator to move the particulate material in the forward direction for the forward time. For example, the controller may operate the drive system to drive the agitator to rotate in the forward rotational direction for the forward time. In this manner, the agitating system moves the particulate material in the secondary storage tank and/or the sub-hopper in the forward rotational direction and/or the first longitudinal direction. Such movement of the particulate material in the secondary storage tank and/or the sub-hopper may break up clumps within the particulate material. The respective metering device of each seed meter may then direct the particulate material through the seed meter (e.g., to a primary conduit).

At block 204, after the forward time has elapsed, the controller operates the drive system to suspend operation of the agitator for the dwell time. During the dwell time, the agitating system does not agitate the particulate material in the secondary storage tank and/or the sub-hopper. However, the particulate material may continue to flow into the seed meters. Moreover, the metering device of each seed meter may continue to move the particulate material through the seed meter and enable additional particulate material to flow into the seed meter.

After the dwell time, the controller operates the drive system to drive the agitator to move the particulate material in the reverse direction for the reverse time, as seen at block 206. The reverse rotational direction is opposite the forward rotational. Moving the particulate material in the reverse direction may be achieved by operating the drive system to drive the agitator to rotate in the reverse rotational direction to move the particulate material in the secondary storage tank and/or the sub-hopper in the reverse rotational direction and/or the second longitudinal direction. In some embodiments, the reverse time is approximately equal to the forward time. Movement of the agitating system in reverse may also move the particulate material in the secondary storage tank and/or the sub-hopper to break up clumps within the particulate material.

After the reverse time has elapsed, at block 208, the controller operates the drive system to suspend operation of the agitator for another dwell time. In certain embodiments, the dwell time directly following the reverse movement may be the same as the dwell time directly following the forward movement. During the dwell time that directly follows the reverse movement, the metering devices continue to direct the particulate material through the respective seed meters. After the dwell time has elapsed, the controller may perform the step of block 202 again to restart the method 200. As such, the method 200 may be repeated throughout operation of the agricultural system.

The method 200 is a non-limiting technique for operating the agitating system. For example, other steps may be performed during and/or between any of the blocks 202-208. That is, the controller may adjust operation of other components of the agitating system while performing the steps of the method 200. Furthermore, although the method 200 begins with driving the agitator forward for a forward time, the method may alternatively begin with driving the agitator in reverse for a reverse time. Further still, while the method 200 includes driving the agitator alternatingly between single iterations of forward and reverse movements, in certain embodiments, the agitator may be driven to move in blocks of forward and reverse operation. For example, the agitator may be driven to move in two iterations of forward operation, with the corresponding dwell time in between, and then in two iterations of reverse operation, with the corresponding dwell time in between. Moreover, although this disclosure primarily discusses driving the agitator to rotate in the forward and reverse rotational directions, movement of the agitator to drive the particulate material in the forward and reverse directions may include any suitable movement (e.g., linear) of the agitator to promote movement of the particulate material.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agitating system of an agricultural system, comprising:
   a drive system configured to operate an agitator via a motor;

a sub-hopper configured to couple to a metering system, wherein the agitator moves particulate material in the sub-hopper; and a controller comprising a memory and a processor, wherein the controller is configured to alternatingly:
instruct the drive system to operate the agitator in an active operation for an active time;
instruct the drive system to suspend operation of the agitator for a dwell time after the active time; and
determine the dwell time based on a geometry of a seed meter of the metering system, a density of particulate material within the sub-hopper, a mass flow rate of the particulate material through the seed meter, or any combination thereof.

2. The agitating system of claim 1, wherein the active operation comprises moving particulate material in a forward direction or moving the particulate material in a reverse direction.

3. The agitating system of claim 1, wherein the agitator comprises a coil, and wherein instructing the drive system to operate the agitator via the motor in the active operation comprises instructing the drive system to rotate the agitator in a first rotational direction to move particulate material in a forward direction or instructing the drive system to rotate the agitator in a second rotational direction opposite the first rotational direction to move particulate material in a reverse direction opposite the forward direction.

4. The agitating system of claim 1, wherein the agitator is configured to promote movement of particulate material through the sub-hopper into the metering system.

5. The agitating system of claim 1, wherein the controller is configured to determine the active time based on a length of an inlet to a seed meter of the metering system, a geometry of the agitator, an operating speed of the agitator, or any combination thereof.

6. The agitating system of claim 1, wherein the controller is configured to receive a user input and to determine the active time, the dwell time, or both, based on the user input.

7. The agitating system of claim 1, wherein the active time and the dwell time are not equal to one another.

8. An agitating system of an agricultural system, comprising:
an agitator comprising an agitator coil;
a drive system configured to drive the agitator via a motor to rotate; and
a controller comprising a memory and a processor, wherein the controller is configured to:
instruct the drive system to drive the agitator to rotate in a forward rotational direction for a forward time;
instruct the drive system to suspend rotation of the agitator for a dwell time after the forward time;
instruct the drive system to drive the agitator to rotate in a reverse rotational direction for a reverse time after the dwell time; and
determine the dwell time based on a geometry of a seed meter of a metering system, a density of particulate material within a sub-hopper, a mass flow rate of the particulate material through the seed meter, or any combination thereof.

9. The agitating system of claim 8, wherein the forward time and the reverse time are approximately equal to one another.

10. The agitating system of claim 8, wherein the controller is configured to receive a user input and to determine the forward time, the reverse time, the dwell time, or any combination thereof, based on the user input.

11. The agitating system of claim 8, wherein the controller is configured to determine the forward time, the reverse time, or both, based on a length of an inlet to a seed meter of a metering system, a geometry of the agitator, an operating speed of the agitator, or any combination thereof.

12. The agitating system of claim 8, wherein the controller is configured to instruct the drive system to suspend rotation of the agitator via the motor for a second dwell time after the reverse time.

* * * * *